Figure 1:
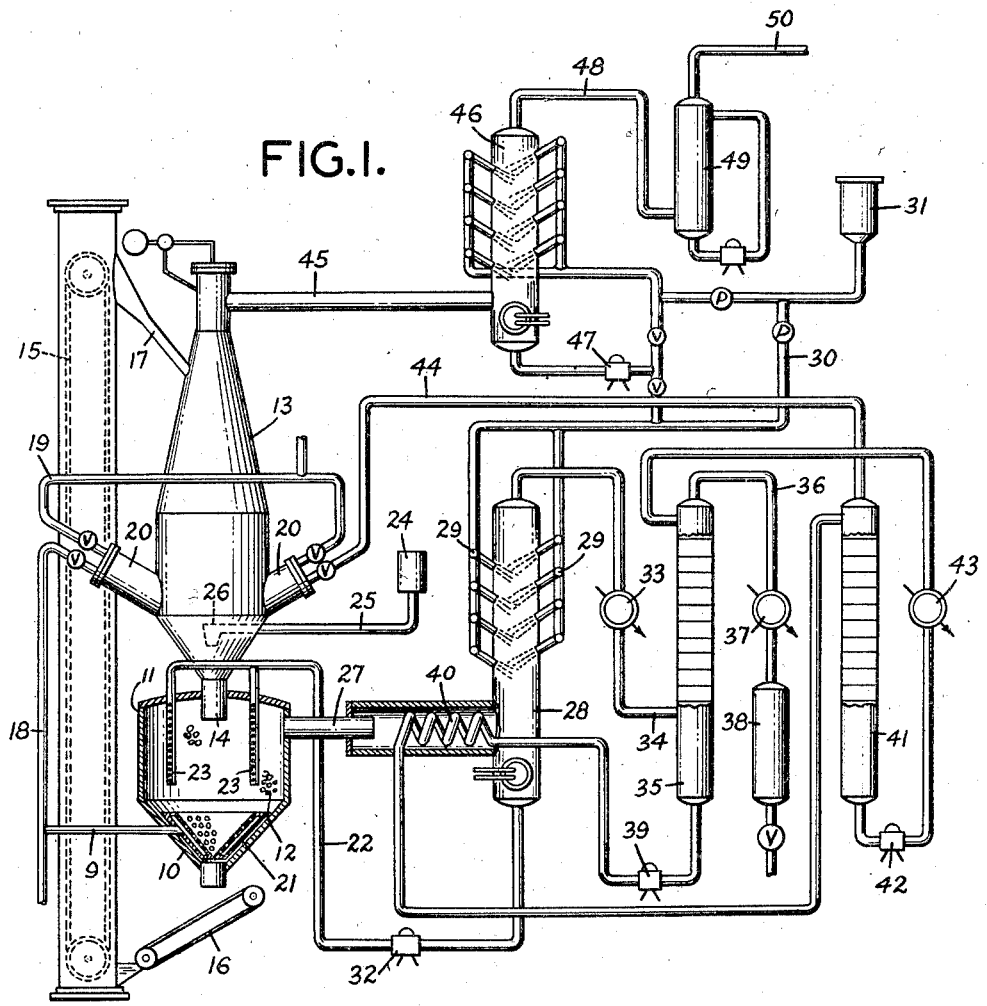

April 9, 1957 R. E. STANTON 2,788,261
PROCESS FOR MAKING CARBON DISULFIDE
Filed May 25, 1948

CONVECTION HEAT TRANSFER ZONE

RADIANT HEAT TRANSFER ZONE

INVENTOR.
ROBERT E. STANTON
BY
Campbell, Brumbaugh, Free & Graves
HIS ATTORNEYS.

United States Patent Office 2,788,261
Patented Apr. 9, 1957

2,788,261

PROCESS FOR MAKING CARBON DISULFIDE

Robert E. Stanton, Denver, Colo.

Application May 25, 1948, Serial No. 29,046

13 Claims. (Cl. 23—206)

This invention relates to a method of making carbon disulfide. It relates more particularly to an improved method of producing carbon disulfide by the reaction between a hydrocarbon, such as methane, and sulfur according to the equation $CH_4 + 4S = CS_2 + 2H_2S$.

The equipment used for producing carbon disulfide by the above-indicated reaction must be made of expensive alloy metals because of the corrosive nature of the compounds used and produced in the reaction. Even alloy metal equipment deteriorates rapidly under the combination of the high temperature required and the corrosive conditions of the reaction.

About one-half of the total weight of the reaction products is in the form of by-product hydrogen sulfide which has been converted heretofore by wasteful methods to recover the original sulfur therefrom. Another disadvantage of the prior methods is that the extremely high viscosity of the sulfur throughout certain critical heating ranges precludes the use of conventional apparatus for the required heating and vaporizing operations.

An object of the present invention is to effect the chemical combination of hydrocarbons with other reactive gases or vapors, for example, the combination of methane and sulfur, without raising the entering reactants to their reaction temperature outside of the conversion zone.

Another object of the invention is to accomplish the reaction of methane and sulfur without the use of expensive alloy metal equipment.

A further object of the invention is to accomplish the reaction between methane and sulfur under conditions permitting efficient utilization of heat input energy and the efficient recovery of energy from the system.

Still another object of the invention is to produce the reaction referred to above while making an effective utilization of heat energy made available by the conversion of by-products into a usable form.

Other objects of the invention will become apparent from the following disclosure.

In accordance with the present invention, I have provided a process in which a hydrocarbon and another reactive compound are reacted in vapor or gaseous form in a heated body of surface active material and the resulting compounds are then further treated in such a way as to separate the various compounds efficiently and economically.

More particularly, methane and molten sulfur are brought into contact and heated by passing them through a bed of ceramic pebbles heated to a temperature sufficiently high to cause the methane to react with the sulfur to produce carbon disulfide, and hydrogen sulfide. These compounds, in the form of vapors, are thereafter scrubbed to remove any residual unreacted sulfur vapor and the hydrogen sulfide is separated from the carbon disulfide by another scrubbing operation. The hydrogen sulfide may be burned to heat or aid in heating the ceramic pebbles and to free elemental sulfur therefrom, thereby doing away with a waste product and recovering a valuable product economically and efficiently.

By suitably controlling the scrubbing operations, it is possible to recover substantial quantities of heat and valuable reagents and thereby render the process of much more efficient and economical than prior methods of producing carbon disulfide.

Figure 2:
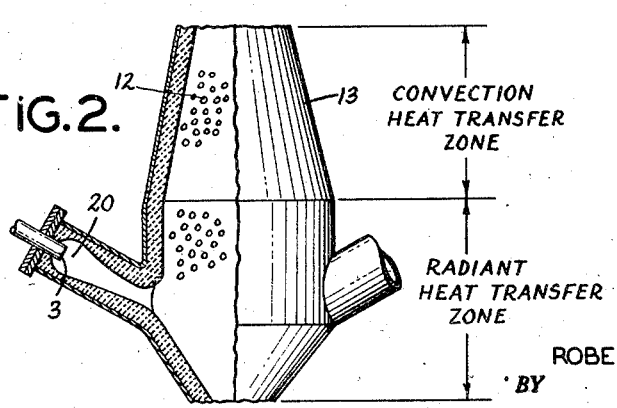

For a better understanding of the present invention, reference may be had to the accompanying drawing, in which:

Fig. 1 is a diagrammatic showing of a typical system for practicing the invention; and Fig. 2 is a view in partial vertical section showing details of the reaction chamber.

Fig. 1 of the drawing discloses a system wherein methane and sulfur are reacted and the reaction products separated and recovered or converted to useful products. One feature of the system is the provision of a reaction chamber 10 which may be formed of refractory material suitably reinforced on the exterior with a metal sheath 11. The chamber 10 is supplied with a mass of heated ceramic pebbles 12 from a furnace or heating chamber 13 disposed above the reaction chamber. The heating chamber or furnace 13 which may take the form of a shell lined with a refractory material such as fire-brick, is connected by means of a duct or passage 14 with the upper end of the reaction chamber 10. The ceramic pebbles flow by gravity from the furnace 13 into the chamber 10 and are returned from the bottom of the reaction chamber to the top of the furnace by means of a bucket type conveyor 15 or other equivalent conveyor. The conveyor 15 receives the pebbles from the conveyor 16 at the lower end of the reaction chamber 10 and discharges them into the upper end of the furnace 13 by means of a chute 17. The above-described apparatus forms the subject matter of my copending application for "Apparatus for High Temperature Treatment of Compounds," Serial No. 29,047 filed May 25, 1948, now Patent No. 2,657,917. The pebbles in the furnace are heated by means of burners 3 (Fig. 2) which are supplied with a suitable fuel gas, for example, methane and/or by hydrogen sulfide, as explained hereinafter, by means of the conduit 18. Combustion supporting air is supplied through the conduit 19. As explained in greater detail in my copending application Serial No. 29,047, now Patent No. 2,657,917, the fuel gas and air are introduced at such a velocity into the muffles 20 near the base of the furnace that the fuel is only partially burned in the muffles and combustion is completed within the spaces between the pebbles 12 in the furnace. In this way, the pebbles in the bottom of the furnace 13 are heated by radiation at flame temperature to a sufficiently high temperature to promote the reaction in the reaction chamber. The pebbles in the top of the furnace are also heated by flow of heated combustion products therethrough so that efficient heat exchange is obtained.

The reaction between methane and sulfur takes place largely in the vapor or gaseous phase. Methane is introduced by means of the conduit 9 into a distributor manifold 21 near the bottom of the reaction chamber 10 so that the methane is heated gradually by contact with the cooler pebbles and flows upwardly through the moving body of pebbles 12. At the same time, molten sulfur is delivered by means of the conduit 22 into the vertical perforated pipes 23 which extend into the mass of pebbles to distribute the sulfur therethrough. The sulfur, upon coming into contact with the highly heated pebbles in the top of the reaction chamber, is vaporized and mixes with the hot methane, and, under the temperature conditions in the reaction chamber 10, they react to form carbon disulfide and hydrogen sulfide. It may be desirable to supply a suitable catalyst, such as aluminum acetate or chromic acid to coat the pebbles, during the heating operation. The catalyst may be introduced in the form of a solution from the catalyst tank 24 through the conduit 25 into the distributing nozzle 26 near the bottom of the furnace 13. The catalyst flows over the pebbles and is dried on the surfaces of the pebbles by contact with them. In some cases, the catalyst may be introduced into the reaction chamber. This can be accomplished by locating the nozzle 26 in the top of the reaction chamber.

The mixture of reaction products consisting chiefly of carbon disulfide, hydrogen sulfide and some unreacted sulfur, are discharged as a vapor through the vapor passage 27 into the bottom of a scrubbing tower 28 where the gases flow upwardly through a series of sprays 29 of molten sulfur, the sulfur being supplied by means of the conduit 30 from a sulfur melting tank 31. In passing through the sprays of molten sulfur, the unreacted sulfur vapor is condensed and removed. The molten sulfur from the sprays is introduced at a temperature slightly above its melting point, for example, at about 200° F., and it is raised in temperature to slightly below its boiling point by contact with the heated vapor. The hot molten sulfur is delivered by means of the pump 32 from the bottom of the scrubber 28 through the conduit 22 into the reaction chamber 10 for reaction therein with additional methane.

The vapor which passes through the sulfur sprays is delivered to a cooling device 33 which lowers the temperature of the mixed hydrogen sulfide and carbon disulfide vapor before delivery through the conduit 34 into the bottom of a scrubber 35. The gases pass upwardly through the scrubber 35 counter-current to a gas-absorbent amine solution, for example, a triethanolamine or monoethanolamine solution, which flows downwardly over the trays in the scrubber. The gas-absorbent solution removes the hydrogen sulfide from the vapor. The temperature of the amine solution or other scrubbing solution is maintained sufficiently high, i. e., above the boiling point of carbon disulfide, so that the carbon disulfide is not condensed by contact with the solution. The carbon disulfide vapor passes over through the conduit 36 to the condenser 37 where it is condensed and delivered to the carbon disulfide receiving tank 38.

The amine solution containing the dissolved hydrogen sulfide is passed by a pump 39 through a coil 40 in the gas outlet connection 27 where it is heated to a sufficiently high temperature to boil off the hydrogen sulfide, this operation taking place in the regenerator tower 41 wherein the amine solution is separated from the gaseous hydrogen sulfide. The amine scrubbing solution is withdrawn from the bottom of the regenerator tower 41 by means of the pump 42, passed through the cooler 43 and delivered to the top of the scrubbing tower 35 for reuse.

The hydrogen sulfide passing off the top of the regenerator is supplied by means of the conduit 44 to the furnace 13 where it is burned to heat the pebbles therein. The ignition temperature of hydrogen sulfide is quite high so that a substantial part of the combustion occurs within the body of pebbles in the lower part of the furnace where temperatures are sufficiently high to support a complete oxidation of the material into elemental sulfur and water vapor. As indicated before, if insufficient hydrogen sulfide is recovered to heat the pebbles, additional fuel, such as methane, may be supplied to the furnace for combustion therein.

The composite combustion gases from the furnace 13 are withdrawn through the flue 45 to a flue gas scrubber 46 wherein the sulfur vapors are removed and recovered by means of sprays of molten sulfur. The molten sulfur is supplied to the scrubber 46 from the sulfur melting tank 31 and it may be in part recirculated through the scrubber 46 or delievered to the scrubber 28 from the bottom of the scrubber 46 by means of the pump 47. The remaining flue gas passes out of the top of the scrubber 46 through the conduit 48 to another scrubbing tower 49 where it flows counter-current to a scrubbing solution, such as, a sodium carbonate solution, to remove objectionable sulfur compounds from the flue gases which are thereafter discharged through the conduit 50.

The above-described process assures a sufficiently high temperature in the reaction chamber 10 to promote substantially complete reaction between methane and sulfur and it also utilizes the by-products and heat supplied to the system to substantially their fullest practical extent. Heat and sulfur may be recovered economically from the waste by-product, hydrogen sulfide. Heat may also be recovered at various stages, for example, from the molten sulfur in the scrubbing towers 28 and 46 by placing coils therein through which water is circulated, for example, to generate steam. Moreover, the various reagents, such as the triethanolamine scrubbing solution, may be reused continuously and the molten sulfur may be brought to a suitable temperature below its reaction temperature with the methane by heat transfer from the gases which are discharged from the reaction chamber and the furnace.

In the reaction, it is desirable to maintain relatively high temperatures in the reaction chamber 10. Thus, for example, the flow of the pebbles through the furnace and the reaction chamber is regulated so that the entire pebble charge is circulated about once in every 45 minutes. The reaction between the sulfur and the methane takes place preferably at about 1300° F. so that the pebbles should be heated to about 1600° F.

The sulfur introduced into the scrubbing towers 28 and 46 should be relatively fluid and thus must be at about 200° F. or higher. Due to its contact with the heated gases passing from the reaction chamber, the sulfur is raised to slightly below its boiling point in the operation described. This temperature is sufficiently high that sulfur is very fluid and is quickly vaporized by contact with the pebbles.

The temperature of the scrubbing solution circulated through the scrubbing tower 35 should be maintained at a temperature above the boiling point of carbon disulfide in order to prevent condensation of the carbon disulfide. A temperature of about 120° F. to 150° F. has been found satisfactory for the temperature of the amine solution.

From the preceding description of a typical form of apparatus and process embodying the present invention, it will be apparent that I have provided means whereby carbon disulfide may be produced economically with a minimum of equipment of expensive and unusual nature.

It will be understood, of course, that the type and size of the equipment used in the system and the temperatures and rates of supply of the various reagents and scrubbing solutions may be varied as the purpose demands. Therefore, the form of the invention described above should be considered as illustrative and not as limiting the scope of the following claims.

I claim:

1. A method of producing carbon disulfide comprising introducing a hydrocarbon and molten sulfur into a reaction zone containing a moving mass of ceramic pebbles having a surface coating of a catalyst and heated to above the boiling point of the sulfur to vaporize the latter and cause it to react with said hydrocarbon to produce a mixed vapor containing hydrogen sulfide, carbon disulfide and unreacted sulfur vapor, scrubbing said mixed vapor with molten sulfur to recover said unreacted sulfur and preheat the molten sulfur to slightly below its boiling point, introducing the preheated molten sulfur into said reaction zone for reaction therein with additional methane and separately recovering said carbon disulfide.

2. A method of producing carbon disulfide comprising introducing methane and molten sulfur into a reaction zone containing a moving mass of ceramic pebbles heated to above the boiling point of the sulfur to vaporize the latter and cause it to react with said methane to produce a mixed vapor containing hydrogen sulfide, carbon disulfide and unreacted sulfur vapor, scrubbing said mixed vapor with molten sulfur to recover said unreacted sulfur and preheat the molten sulfur to slightly below its boiling point, introducing the preheated molten sulfur into said reaction zone for reaction therein with additional methane, further scrubbing said mixed vapors, less the unreacted sulfur, with a solvent for hydrogen sulfide, maintaining the temperature of said solvent above the boiling point of carbon disulfide to permit the latter to pass over as a vapor, regenerating said solvent to drive off said hydrogen sulfide, and burning the latter to heat said ceramic pebbles outside said reaction zone.

3. A method of producing carbon disulfide comprising introducing methane and molten sulfur into a reaction zone containing a moving mass of ceramic pebbles heated to above the boiling point of the sulfur to vaporize the latter and cause it to react with said methane to produce a mixed vapor containing hydrogen sulfide, carbon disulfide and unreacted sulfur vapor, scrubbing said mixed vapor with sprays of molten sulfur to recover said unreacted sulfur and heat the sprayed sulfur to slightly below its boiling point, introducing the heated sprayed sulfur into said reaction zone for reaction therein with additional methane, further scrubbing said mixed vapors, less the unreacted sulfur, with a solvent for hydrogen sulfide, maintaining the temperature of said solvent above the boiling point of carbon disulfide to permit the latter to pass over as a vapor, regenerating said solvent to drive off said hydrogen sulfide, burning the latter to convert it to vapor containing water and sulfur, and scrubbing the last-mentioned vapor with molten sulfur to recover the sulfur from said vapor.

4. A method of producing carbon disulfide comprising introducing methane and molten sulfur into a reaction zone containing a moving mass of pebbles having catalytic surfaces heated to above the boiling point of the sulfur to vaporize the latter and cause it to react with said methane to produce a mixed vapor containing hydrogen sulfide, carbon disulfide and unreacted sulfur vapor, scrubbing said mixed vapor with molten sulfur to recover said unreacted sulfur and preheat the molten sulfur to slightly below its boiling point, introducing the preheated molten sulfur into said reaction zone for reaction therein with additional methane, further scrubbing said mixed vapors, less said unreacted surfur, with a triethanolamine solution to remove the hydrogen sulfide from said mixed vapors, separating said hydrogen sulfide from said solution, burning the hydrogen sulfide to heat said pebbles prior to their introduction into said reaction zone, maintaining the temperature of said solution above the boiling point of carbon disulfide to permit the latter to pass over as a vapor, and condensing said carbon disulfide vapor.

5. A method of producing carbon disulfide comprising introducing methane and molten sulfur into a reaction zone containing a moving mass of ceramic pebbles heated to above the boiling point of the sulfur to vaporize the latter and cause it to react with said methane to produce a mixed vapor containing hydrogen sulfide, carbon disulfide and unreacted sulfur vapor, scrubbing said mixed vapor with molten sulfur to recover said unreacted sulfur and preheat the molten sulfur to slightly below its boiling point, introducing the preheated molten sulfur into said reaction zone for reaction therein with additional methane, further scrubbing said mixed vapors, less said unreacted sulfur, with a triethanolamine solution to remove the hydrogen sulfide from said mixed vapors, maintaining the temperature of said solution above the boiling point of carbon disulfide to permit the latter to pass over as a vapor, regenerating said solution to drive off said hydrogen sulfide, burning the latter to heat said ceramic pebbles outside said reaction zone, and condensing said carbon disulfide vapor.

6. A method of producing carbon disulfide comprising introducing a hydrocarbon and molten sulfur into a reaction zone containing a moving mass of ceramic pebbles heated to above the boiling point of the sulfur to vaporize the latter and cause it to react with said hydrocarbon in the reaction zone to produce a mixed vapor containing hydrogen sulfide, carbon disulfide and unreacted sulfur vapor, scrubbing said mixed vapor with molten sulfur to recover said unreacted sulfur and preheat the molten sulfur to slightly below its boiling point, introducing the preheated molten sulfur into said reaction zone for reaction therein with additional hydrocarbon, further scrubbing said mixed vapors, less the unreacted sulfur, with a solvent for hydrogen sulfide, maintaining the temperature of said solvent above the boiling point of carbon disulfide to permit the latter to pass over as a vapor, regenerating said solvent to drive off said hydrogen sulfide, and burning the latter to heat said ceramic pebbles outside said reaction zone.

7. A method of producing carbon disulfide from reaction of a hydrocarbon and molten sulfur in the presence of a moving mass of catalyst-coated ceramic pebbles heated to above the boiling point of the sulfur which comprises applying a surface coating of said catalyst to the pebbles following said heating and immediately preceding said reaction, introducing said hydrocarbon and molten sulfur into a reaction zone and into contact with said catalyst-coated heated pebbles in a reaction zone to produce a mixed vapor containing hydrogen sulfide, carbon disulfide and unreacted sulfur vapor, scrubbing said mixed vapor with molten sulfur to recover said unreacted sulfur and to preheat the molten sulfur to slightly below its boiling point, introducing the preheated sulfur into said reaction zone for reaction therein with additional hydrocarbon, further scrubbing said mixed vapors, less the unreacted sulfur, with a solvent for hydrogen sulfide, maintaining the temperature of said solvent above the boiling point of carbon disulfide to permit the latter to pass over as a vapor, regenerating said solvent to drive off said hydrogen sulfide, burning the latter to heat said ceramic pebbles outside said reaction zone.

8. A process according to claim 7 in which the hydrocarbon is methane.

9. A method of producing carbon disulfide from reaction of a hydrocarbon and molten sulfur in the presence of a moving mass of catalyst-coated ceramic pebbles heated to above the boiling point of the sulfur which comprises heating said ceramic pebbles by the combustion of fuel on the surface of the pebbles, applying a surface coating of said catalyst to the pebbles following said heating and immediately preceding said reaction, introducing said hydrocarbon and said molten sulfur into a reaction zone and into contact with said catalyst-coated heated pebbles to produce a mixed vapor containing hydrogen sulfide, carbon disulfide and unreacted sulfur, scrubbing said mixture with molten sulfur to recover any unreacted sulfur in said mixture and preheat the molten sulfur to slightly below its melting point, introducing the preheated sulfur into said reaction zone for reaction therein with additional hydrocarbon, separately recovering said carbon disulfide, recovering said hydrogen sulfide from said vapor and burning it to heat said pebbles outside said reaction zone.

10. In the preparation of carbon disulfide by the vapor phase reaction of sulfur with a hydrocarbon in a reaction zone in the presence of pebbles having a surface coating of a catalyst at a temperature sufficiently high to vaporize said sulfur, the improvement which comprises supplying at least part of the necessary heat for the reaction by burning hydrogen-sulfide with oxygen in a combustion zone in the presence of the pebbles whereby sulfur is produced and whereby the heat of the exothermic combustion reaction is imparted to the pebbles, and passing the sulfur and the heated pebbles from the combustion zone to the reaction zone.

11. A method of producing carbon disulfide comprising heating molten sulfur and a hydrocarbon in the presence of solid ceramic elements having catalytic surfaces to about 1300° F. to vaporize said sulfur and react it with said hydrocarbon to produce a mixture of hydrogen sulfide and carbon disulfide vapor, scrubbing said mixture with molten sulfur to recover any unreacted sulfur in said mixture and to preheat the molten sulfur, introducing said preheated sulfur into the reaction zone, further scrubbing said mixture with a solvent for hydrogen sulfide, said solvent being maintained at a temperature above the boiling point of carbon disulfide, whereby the latter passes over as a vapor, condensing said carbon disulfide vapor, separating the hydrogen sulfide from said solvent, and burning the hydrogen sulfide outside the reaction zone to heat the ceramic elements.

12. In the preparation of carbon disulfide by the vapor phase reaction of sulfur with a hydrocarbon in a reaction zone in the presence of solid ceramic elements having catalytic surfaces at a temperature sufficiently high to vaporize said sulfur, the improvement which comprises supplying the necessary heat for the reaction by burning a combustible sulfur-containing material in an oxygen-containing gas in a combustion zone in the presence of the ceramic elements whereby sulfur is produced and whereby the heat of the exothermic combustion reaction is imparted to the ceramic elements, and passing the sulfur and heated ceramic elements from the combustion zone to the reaction zone.

13. In the preparation of carbon disulfide by vapor phase reaction of sulfur with a hydrocarbon in a reaction zone in the presence of a circulating column of solid ceramic elements having catalytic surfaces at a temperature sufficiently high to vaporize the sulfur, the improvement which comprises supplying the necessary heat for the reaction by burning a combustible material containing hydrogen sulfide with oxygen in a combustion zone in the presence of said ceramic elements whereby sulfur is produced and whereby the heat of the exothermic combustion reaction is imparted to said ceramic elements and passing the sulfur and the heated ceramic elements from the combustion zone to the reaction zone.

References Cited in the file of this patent

UNITED STATES PATENTS

| | | |
|---|---|---|
| 1,978,506 | Punnett | Oct. 30, 1934 |
| 2,330,934 | Thacker | Oct. 5, 1943 |
| 2,386,202 | Fernelius | Oct. 9, 1945 |
| 2,387,763 | Luaces | Oct. 30, 1945 |
| 2,432,520 | Ferro | Dec. 16, 1947 |
| 2,503,188 | Bergstrom | Apr. 4, 1950 |
| 2,508,292 | Porter et al. | May 16, 1950 |